United States Patent [19]
> Ekkelboom et al.

[11] 4,086,075

[45] Apr. 25, 1978

[54] METHOD OF MANUFACTURING AN ARTICLE CONTAINING AT LEAST ONE GLASS PART IN WHICH A METAL PART IS SEALED IN

[75] Inventors: Tjepke Hendrik Ekkelboom; Thomas Geeven, both of Eindhoven, Netherlands

[73] Assignee: U.S. Philips Corporation, New York, N.Y.

[21] Appl. No.: 747,349

[22] Filed: Dec. 3, 1976

Related U.S. Application Data

[63] Continuation of Ser. No. 594,029, Jul. 8, 1975, abandoned.

[30]     Foreign Application Priority Data

Jul. 12, 1974   Netherlands ..................... 7409432

[51] Int. Cl.² ........................................... C03C 27/02
[52] U.S. Cl. ..................................... 65/40; 65/59 R; 65/DIG. 4
[58] Field of Search ................... 65/40, 59 R, DIG. 4

[56]             References Cited

U.S. PATENT DOCUMENTS

| | | | |
|---|---|---|---|
| 2,093,567 | 9/1937 | McCullough | 65/40 X |
| 2,386,820 | 10/1945 | Spencer | 65/DIG. 4 |
| 3,893,837 | 7/1975 | Gasbarro | 65/40 X |

*Primary Examiner*—Arthur D. Kellogg
*Attorney, Agent, or Firm*—Frank R. Trifari; Robert S. Smith

[57]             ABSTRACT

A method of making glass beads for current leading-in wires of lamps by internal and external high-frequency heating of a glass tube which surrounds a metal rod.

7 Claims, 6 Drawing Figures

METHOD OF MANUFACTURING AN ARTICLE CONTAINING AT LEAST ONE GLASS PART IN WHICH A METAL PART IS SEALED IN

This is a continuation of application Ser. No. 594,029, filed July 8, 1975 now abandoned.

The invention relates to a method of manufacturing an article containing at least one glass part in which a metal part is sealed in. The invention also relates to an apparatus for carrying out such a method and to articles, for example lamps, which are manufactured by means of such a method.

The metal part may be rod-shaped, filamentary or disc-shaped; the metal part may also be hollow, for example be in the form of a tube.

For many articles, in particular lamps such as gas discharge lamps and incandescent lamps, it is necessary to seal metal parts in a gastight manner in a glass part, in particular the wall. Successful performance of such a sealing operation depends upon many factors. Some of these factors are the values of the coefficients of expansion of the parts to be joined, the atmosphere in which sealing-in takes place and in particular the skill of the person required to make the seal.

In the literature many directions are found for making seals which are gastight and do not crack during use of the articles. In the methods described widely different points are mentioned which are to be heeded in making the seals. It was found in practice that a good seal is obtained only by a particularly fortunate combination of the various directions. Obviously it is necessary to pay attention to all the aforementioned points, but in addition requirements are to be satisfied which do not concern the seal itself but do concern the use of the article to be manufactured. For example, for some lamps special metals, such as tungsten and molybdenum, or special wall materials, such as fused silica or hard glass, must be used. All these circumstances together result in that from the literature no universal method is known which can successfully be used under widely different conditions. Hence frequently highly complex seals, for example using intermediate glasses, or complicated accurately defined consecutive stages of manufacture have been resorted to.

In many cases manufacture starts from a filamentary or rod-shaped metal part to which first a glass bead is applied. This glass bead then is joined to the remainder of the article to be manufactured by means of a discrete step in which the joint is established by heating.

The glass bead may be applied to the metal part in various manners, for example by heating the metal part and then bringing it into contact with a glass rod which is made plastic, for example by means of a burner. It will be understood that the term "plastic" herein refers to a physical characteristic whereby the material may be deformed without rupture. Rotating the metal part enables a bead to be applied, the success of the method being highly dependent upon the aforementioned circumstances. Another method of applying a bead starts from a glass tube which approximately fits around the metal part; by heating, for example by a burner, or by electric heating the tube is sealed to the metal part.

An important disadvantage of the known methods further is that some combinations of metal and glass which are desirable with a view to the use of the article to be manufactured cannot, or cannot readily, be reproducibly realized.

A large disadvantage attendant on many of the known methods further is that during the making of the bead the surface of the metal is oxidized when the operation is performed in air. This can be avoided by making the bead in a shielding gas; however it will be evident that supplying the shielding gas complicates the operation and in some methods can hardly furnish success. In this connection we have in mind the aforementioned method in which the end of a glass rod is heated and is pressed onto a rotating metal part. In this process shielding gas may be supplied through a pipe near the bead to be made, but even then oxidation cannot completely be avoided with certainty. Consequently the metal adjoining the bead will oxidize, which often is highly undesirable for use, in particular in lamps. Hence it always has been necessary after the making of the bead to remove the oxide film from the metal part by grinding or etching. This means, however, that the metal part at the relevant location becomes thinner, which afterwards may readily give rise to fracture of this part and in addition jeopardizes the gas-tightness, because the metal inside the bead, in particular at it ends, may be attacked. If in operation the metal part is required to carry an electric current, additional heat will be developed at the location of the thinner portion so that the risk of cracking is further increased at this very location.

The method according to the invention of manufacturing an article containing at least one glass part in which a metal part is sealed is characterized in that the article is manufactured by shaping the glass part in the form of a tube which internally has about the same shape and cross-section as the metal part, the tube is slipped onto the metal part and the resulting assembly is heated by passing it through a high-frequency electric field so as to produce a melting zone. In this zone additionally a non-short-circuited electrically conducting winding is located through which the assembly is passed, the heating procedure being effected in a non-oxidizing shielding gas.

Compared with the known methods a method according to the invention entails many advantages. Some of these advantages are given in the following list:

1. the method can generally be applied to widely different materials;
2. the method may readily be automated so that success does no longer depend upon high skill of the operator;
3. the seal obtained is gas-tight and remains so during use of the article;
4. in the resulting seal there is a uniform build-up of stresses so that cracking is reduced to a minimum;
5. the cross-sectional area of the metal part is not decreased.

Although some elements of a method according to the invention are to be found in the literature, the above-mentioned and other advantages are obtained only by the combination of steps according to the invention.

Embodiments of the invention will now be described by way of example, with reference to the accompanying diagrammatic drawings, in which.

Figure 1:
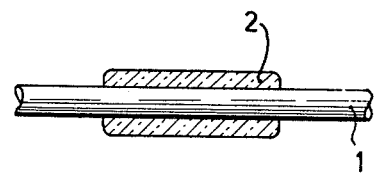
FIG. 1 is a schematic sectional view of a rod carrying a bead.

Referring now to FIG. 1, reference numeral 1 denotes a metal rod-shaped part made, for example, of tungsten; a glass bead 2 is so secured to this metal rod as to produce a gastight joint between the rod and the bead. Such an assembly may be used, for example, as a current lead-in for a wide variety of lamp types. For this purpose other glass parts, for example a lamp bulb, may be secured to the bead 2.

Figure 2:
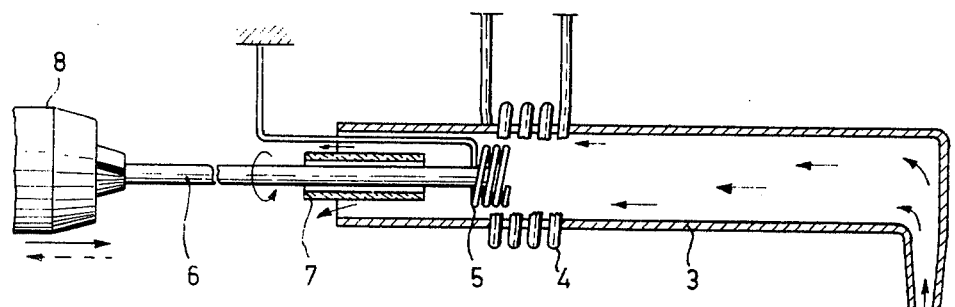
FIGS. 2 to 5 show schematically an apparatus for carrying out a method according to the invention at different stages of manufacture of a bead.

The apparatus shown in FIG. 2 comprises the following component parts. Reference numeral 3 denotes a large-bore tube made, for example, of glass or fused silica and surrounded by a high-frequency coil 4. By means of this coil 4 a melting zone is produced in the tube 3, i.e. a zone in which the material of the bead to be made can be heated to a temperature such as to become appropriately plastic. A non-short-circuited or open winding 5 of helical form is placed in the tube 3. The winding 5 is disposed at the location of the melting zone and will be understood to be a coil in which the ends are not connected. If required by the nature and the size of the materials to be worked the coil 5 can be axially displaced. In the drawing it is located at the left-hand end of the high-frequency coil 4. As will be explained more fully hereinafter, this is a preferred location for making a high-quality bead.

The bead is made from a glass tube 7 slipped onto a metal rod 6. The glass tube 7 fits fairly closely around the rod 6. The rod is clamped in a chuck 8. The chuck is capable of rotation and of axial displacement. At its right-hand end the tube 3 has an opening 9. Through this opening a shielding gas can be supplied to flow in the direction indicated by the arrows.

Figure 3:
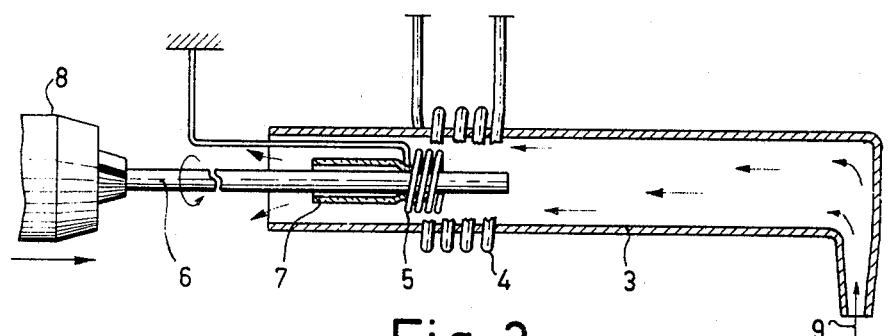
Figure 4:
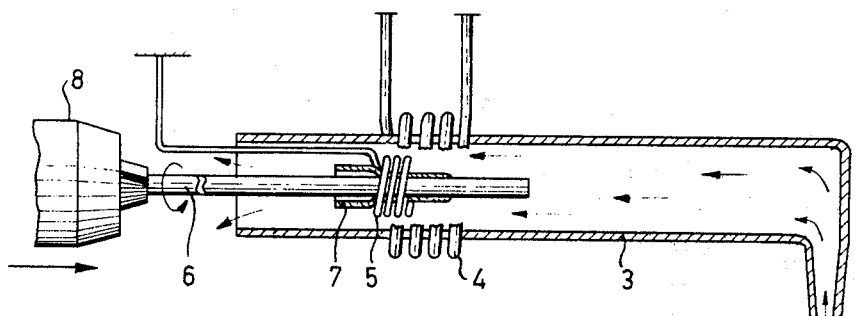
Figure 5:
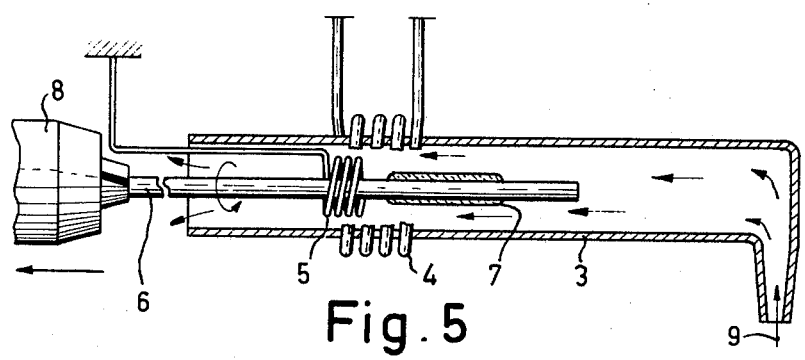

Making the bead is effected as follows. While the gas stream is passed through the tube 3 and the high-frequency field is generated by means of the coil 4 the rod 6 together with the tube 7 it carries are moved from left to right. Preferably the rod 6 together with the tube 7 is also rotated, but this is not always necessary to obtain a high-quality bead. The rod 6 is heated by the high-frequency field generated by the coil 4. The rod transfers heat to the inner surface of the tube 7. At the instant at which the assembly of 6 and 7 enters the winding 5 the tube 7 is heated externally as well, for the winding 5 is also heated by the high-frequency field. The winding 5 must not be short-circuited, because otherwise it would be melted by the heat developed. Thus in the melting zone the glass tube 7 is heated from the inside and from the outside. Owing to the displacement in the direction of length from left to right the right-hand part of the tube 7 will first become plastic and adhere to the rod 6. This instant is shown in FIG. 3. At this stage the tube is still open at the left so that impurities evolved from the rod and/or the glass tube 7 can escape to the left. FIG. 4 shows the instant at which more than half of the glass tube adheres to the rod 6. Finally FIG. 5 shows the instant at which the entire bead is finished. The high-frequency field can then be switched off and the rod 6 provided with the bead can be retracted. Preferably the gas stream is maintained during retracting also.

Because the entire operation of making the bead is performed in a shielding gas there is substantially no likelihood of oxidation of the metal. Hence the finished bead is entirely free from oxide and need not be etched. Because, as mentioned hereinbefore, no impurities can collect between the rod and the glass part of the bead, the joint between the glass and the metal is complete and hence gastight.

By means of a method according to the invention widely different vitreous materials and metals can be joined to one another. However, the choice of the non-oxidizing shielding gas must be adapted to the materials used, in particular to the glass used. It was found, for example, that when fused silica parts are used the shielding gas atmosphere must be neutral. For fused silica a suitable shielding gas is, for example, nitrogen. If when working fused silica in making a bead a weakly reducing gas is used, for example a so-called incombustible mixed gas, i.e. a mixture of 8% of hydrogen and 92% of nitrogen, a dark-coloured film is formed between the metal part and the fused silica which prevents adherence. When using a neutral shielding gas, for example nitrogen, a completely smooth tightly adherent bead is obtained.

When using normal glasses, either hard glass or soft glass, it generally is desirable for the shelding gas to be mildly reducing. In such a case incombustible mixed gas can be used to advantage.

By means of a method according to the invention it is possible inter alia to make glass beads as thoriated tungsten filaments. Hitherto this has not been possible by any of the known methods, because always the thorium diffused to the surface of the tungsten, preventing close gas-tight adherence. However, for many gas discharge lamps thoriated tungsten is a highly attractive electrode material in view of its emitting properties. Hitherto when using such a material the lead-in has had to be made of tungsten whereas the portion inside the discharge space was allowed to consist of thoriated tungsten, which portion was secured to the tungsten lead-in member, for example, by welding.

By means of a method according to the invention lead-ins of widely different sizes were made which when used in lamps did not provide difficulty in respect of cracking, breaking off etc. The diameter of the current leading-in wire can be chosen from a few tenths of millimeters to more than two centimeters. Such a leading-in wire may, if required, be formed with one or more channels. Thus they may be cooled, for example, by a stream of a liquid or gas.

Figure 6:
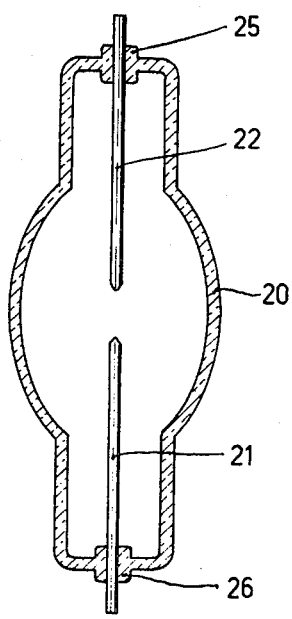
FIG. 6 is a schematic sectional view of a short-arc lamp provided with bead seals according to the invention.

FIG. 6 shows a high-pressure xenon arc lamp comprising a hard-glass bulb 20 accommodating a tungsten rod 21 and a thoriated tungsten rod 22. The electrodes 21 and 22 each are made in one piece and are secured in a gas-tight manner in the wall 20 by means of beads made in a separate operation. The beads are designated by 25 and 26. The glass of the beads 25 and 26 is the same as that used for the bulb 20. No intermediate glasses are required.

It should be mentioned that the high-frequency coil 4 may extend beyond the melting zone in order to preheat a glass and/or metal part. However, outside the melting zone heating must not become so intense as to make the glass plastic at this location.

The non-short-circuited electrically conducting winding need not be helical, although this shape is attractive, for the pitch and/or the diameter of a helical winding may be made different at different locations and hence heat generation and heat transfer may be varied. This enables, for example beads to be applied by starting from tubes which are considerably wider than the cross-sectional area of the metal part.

What is claimed is:

1. A method of manufacturing an article which includes at least one glass part in which a metal part is sealed which comprises: providing an elongated metal part; shaping a quantity of glass in the form of a tube which internally has about the same shape and cross-section as the metal part; slipping the glass tube onto the metal part and heating the resulting assembly by passing it through a high-frequency electric field, said heating step including providing only an open electrically conducting winding through which winding the assembly is passed, said heating step being performed in a non-oxidizing shielding gas.

2. A method as claimed in claim 1, wherein the electrically conductive winding is a helically wound wire.

3. A method as claimed in claim 1 wherein during said slipping step the glass tube and the metal part rotates during said heating step.

4. A method as claimed in claim 1 wherein the glass consists of a normal glass and the shielding gas is mildly reducing.

5. A method as claimed in claim 4, wherein the shielding gas is an incombustible mixed gas.

6. A method as claimed in claim 1 wherein the glass consists of fused silica and the shielding gas is neutral.

7. A method as claimed in claim 6 wherein the shielding gas is nitrogen.

* * * * *